United States Patent
Deonarine

(10) Patent No.: US 7,316,506 B2
(45) Date of Patent: Jan. 8, 2008

(54) DUAL TEMPERATURE INDICATOR STICK HOLDER

(75) Inventor: Victor Deonarine, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1055 days.

(21) Appl. No.: 09/683,353

(22) Filed: Dec. 18, 2001

(65) Prior Publication Data

US 2003/0076869 A1    Apr. 24, 2003

Related U.S. Application Data

(63) Continuation-in-part of application No. 09/682,843, filed on Oct. 23, 2001, now Pat. No. 6,857,777.

(51) Int. Cl.
  *G01K 1/00*    (2006.01)
  *G01K 11/00*   (2006.01)
(52) U.S. Cl. .................... 374/208; 374/160
(58) Field of Classification Search ........... 374/160, 374/208, 161, 162; 401/16, 17, 19, 31, 34, 401/35; 279/2.02
See application file for complete search history.

(56) References Cited

U.S. PATENT DOCUMENTS

| | | | | |
|---|---|---|---|---|
| 515,075 A * | 2/1894 | Deats | | 33/27.02 |
| 803,464 A * | 10/1905 | Beck | | 24/339 |
| 1,603,713 A * | 10/1926 | Peterson | | 401/93 |
| 1,983,728 A * | 12/1934 | Bafetti | | 401/93 |
| 2,020,676 A * | 11/1935 | Ellis et al. | | 374/160 |
| 2,656,605 A * | 10/1953 | Schlieder | | 33/41.4 |
| 2,785,654 A * | 3/1957 | Lundberg, Sr. et al. | | 401/93 |
| 3,442,595 A * | 5/1969 | Dumas | | 401/35 |
| 3,564,668 A * | 2/1971 | Kirk | | 281/30 |
| 4,244,660 A * | 1/1981 | Aronson | | 402/79 |
| 4,351,185 A * | 9/1982 | Garcia | | 73/104 |
| 4,415,092 A * | 11/1983 | Boyer | | 401/88 |
| 4,468,146 A * | 8/1984 | Tabachnik | | 401/88 |
| 4,473,113 A * | 9/1984 | Whitfield et al. | | 165/185 |
| 4,505,421 A * | 3/1985 | Gen et al. | | 228/224 |
| 4,549,827 A * | 10/1985 | Mack | | 401/29 |
| 4,902,151 A * | 2/1990 | Asano et al. | | 401/34 |
| 5,318,372 A * | 6/1994 | Besthorne | | 401/19 |
| 5,368,405 A * | 11/1994 | Sixiong | | 401/35 |
| D389,517 S * | 1/1998 | Frank | | 401/195 |
| 5,918,981 A * | 7/1999 | Ribi | | 374/162 |
| 6,022,159 A * | 2/2000 | Kossnar et al. | | 401/35 |
| D443,838 S | 6/2001 | Kleiman et al. | | |
| 6,276,854 B1 * | 8/2001 | Mullins | | 401/88 |
| 6,290,413 B1 * | 9/2001 | Wang | | 401/30 |
| 2002/0032069 A1 * | 3/2002 | Arrison | | 473/36 |

OTHER PUBLICATIONS

OMEGA, Brochure for "OMEGAMARKER® Temperature Test Kit", No date.*
OMEGA Engineering, Inc., "The Temperature Handbook", vol. 29, p. F-10 (item cited "OMEGAMARKER® Temperature Test Kit"), 1995.*
Tempil: Temperature Indicators and Industrial Coatings Brochure, *Tempilstik*, pp. 1-5.

* cited by examiner

*Primary Examiner*—Gail Verbitsky
*Assistant Examiner*—Mirellys Jagan
(74) *Attorney, Agent, or Firm*—Ziolkowski Patent Solutions Group, SC

(57) ABSTRACT

An apparatus to combine temperature indicator sticks used in the welding, metal fabrication, and heat treatment industries and capable of identifying at least two given temperatures is disclosed. The apparatus includes a first temperature indicator stick aligned along a first axis and comprised of a compound which melts at a first temperature, and a second temperature indicator stick aligned along a second axis and formed of another compound which melts at a second temperature. The apparatus also includes a connector physically connecting and aligning the first and second indicator sticks.

17 Claims, 2 Drawing Sheets

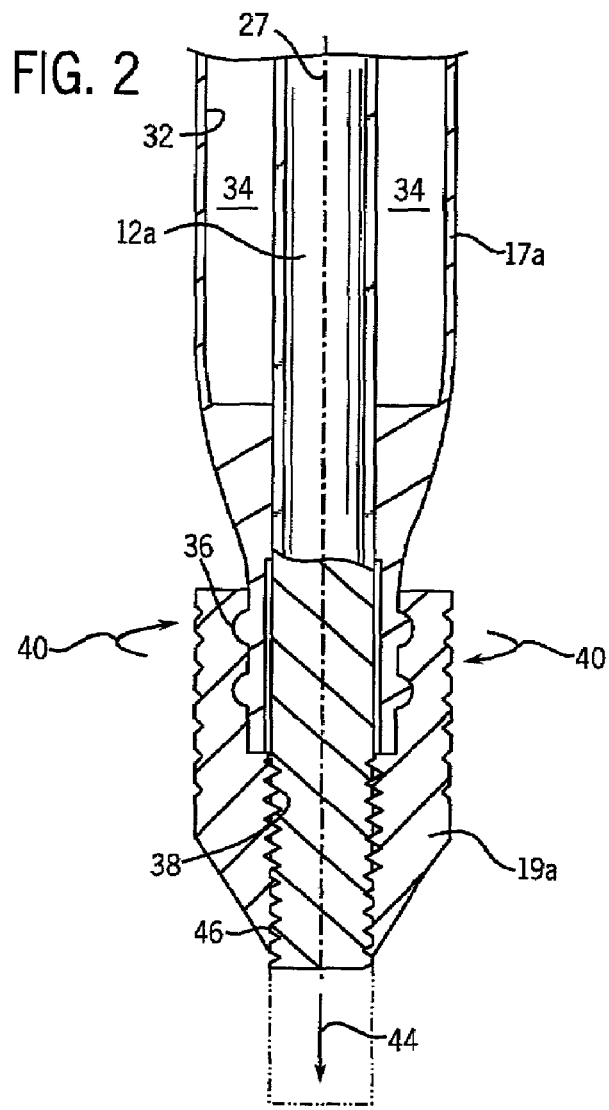
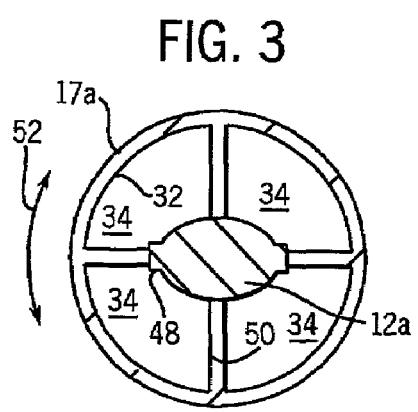
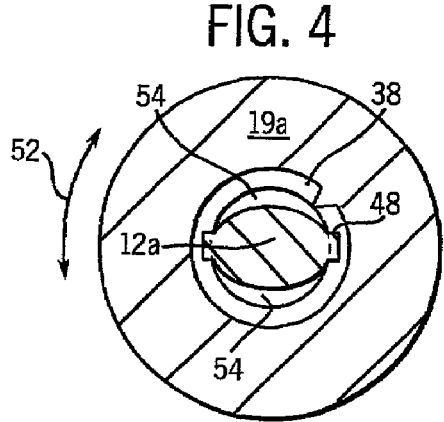

DUAL TEMPERATURE INDICATOR STICK HOLDER

CROSS REFERENCE TO RELATED APPLICATIONS

This application claims the benefit of prior U.S. patent application Ser. No. 09/682,843 filed Oct. 23, 2001 now U.S. Pat. No. 6,857,777 and entitled "DUAL TEMPERATURE INDICATOR STICK HOLDER."

BACKGROUND OF INVENTION

The present invention relates generally to temperature indicators, and more particularly, to an apparatus and method to independently extend and retract a pair of temperature indictor sticks longitudinally aligned along two axes.

Temperature indicators are well known in the welding, metal fabrication, and heat treatment industries. Such products are capable of determining surface temperatures during welding and metal fabrication processes. The products have also found use in heat-treatment processes, and can determine operating temperatures of mechanical, hydraulic, and electrical systems and components, such as transformers and motors.

Initially, temperature sensing was conducted by sprinkling a few granules of a known compound on an object. When the granules melted, the desired temperature was achieved. Later, pellets were introduced to make marks similar to a chalk mark on a surface of the object rather than observing the entire pellet melt. Further improvements led from a pellet to a chalk stick, which is protected in a housing that includes an adjustable holder for positioning the temperature indicator stick relative to the housing.

One known temperature indicator includes a housing having a rimmed end and a flanged end. A temperature indicator stick is inserted into the housing through the flanged end and prevented from leaving the housing by the rimmed end. The stick also has an outer casing or holder that is threaded into the housing and encloses the flanges. The outer casing is tapered to constrict the flanges and lock the temperature indicator stick in a fixed position.

Problems exist with the current state of the art of temperature indicators. Existing holders for temperature indicators are not satisfactory. Such holders are often limited in their ability to fix the temperature indicator stick in position. Operator use of the temperature indicator stick results in pressure exerted on the end of the stick during marking which causes the stick to retract into the housing. Generally, the operator must unscrew the outer casing, reposition the temperature indicator stick, and then retighten the outer casing to continue marking objects.

Another problem is that current temperature indicators are configured to hold one temperature indicator stick, limiting temperature detection to a single temperature value. Operators desiring to detect several temperatures must carry or locate multiple temperature indicators, which is often tedious. Furthermore, since current temperature indicators are configured for a single stick, the indicator sticks are generally positioned within tubular-shaped housings that are difficult to adjust during use, especially in welding and other heat-treating processes that require an operator to wear gloves and other heat-protection equipment which limits the operator's ability to manipulate small objects. Further, many applications require two different temperature indicator sticks for testing different temperatures in a single operation. It is difficult for an operator to hold a welding gun in one hand, for example, and two temperature indicator sticks in the other hand while wearing heat-resistant gloves.

There is a need for an apparatus and method to separately fix a pair of temperature indicator sticks in position to improve an operator's ability to hold and manipulate the temperature indicator sticks to mark objects for temperature detection, and also to reduce the number of temperature indicator holders needed by operators. It would therefore be desirable to have a more efficient temperature indicator than current indicators by having a pair of temperature indicator sticks aligned along a pair of axes in a single housing and having a pair of advancement mechanisms to engage each temperature indicator stick independently.

BRIEF DESCRIPTION OF INVENTION

The present invention is directed to an apparatus and method to detect multiple temperatures with a single indicator stick apparatus to overcome the aforementioned concerns.

The invention includes a connector for holding a pair of temperature indicator sticks, where each indicator stick melts at a different temperature. These indicator sticks are rated to measure a given temperature, which is generally not the same value, during welding, heat treatment, and metal fabrication processes. The connector is further configured to removably hold the indicator sticks together, and includes a convenient pocket clip.

In accordance with one aspect of the present invention, a dual temperature indicator stick is disclosed having a first indicator stick positioned along a first axis and comprised of a compound which melts at a first given temperature. The dual temperature indicator stick also includes a second indicator stick positioned along a second axis and comprised of a compound which melts at a second given temperature, and a connector. The connector physically connects the first and second indicator sticks together in a side-by-side relationship along different axes and allows for easy replacement of the indicator sticks.

In accordance with another aspect of the present invention, a dual temperature indicator stick holder includes a connector assembly adapted to receive a pair of temperature indicator sticks. The dual temperature indicator stick holder also includes a pair of advancement mechanisms configured to extend the temperature indicator sticks from the connector assembly. Each advancement mechanism is configured to engage a respective temperature indicator stick upon rotation of one of the advancement mechanisms to advance or retract the temperature indicator stick.

In a further aspect of the present invention, a dual temperature indicator stick apparatus is provided having a first means for indicating a first temperature, and a second means for indicating a second temperature. The apparatus also includes a means for retaining the first means to the second means in a side-by-side relationship to form an indicator stick assembly capable of indicating at least two temperatures.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 2 is a partial longitudinal cross-section of the apparatus of FIG. 1.

FIG. 3 is a cross-sectional view taken along line 3-3 of FIG. 1.

FIG. 4 is a cross-sectional view taken along line 4-4 of FIG. 1.

DETAILED DESCRIPTION

Various temperature detection monitors are used by the welding, metal fabrication and heat treatment industries to measure temperatures of materials. Determining surface temperatures is critical during welding and metal fabrication processes, such as pre-heat and post-weld heat treatment. Temperature monitoring is also important for determining operating temperatures of various mechanical, electrical, and hydraulic systems and components. These components, such as a motor or transformer, can be destroyed or alternatively have their device characteristics substantially altered if the components are not manufactured within a specified temperature range.

Several detection devices and methods exist to determine surface and operating temperatures. Some devices use gauges or electronic components having thermistors, whereas others use chemical compounds formed as temperature indicator sticks that feed through mechanical temperature indicators. Although each of these detection devices has advantages, temperature indicators have been found to be particularly useful due to their ease of use and inexpensive cost.

Figure 1:
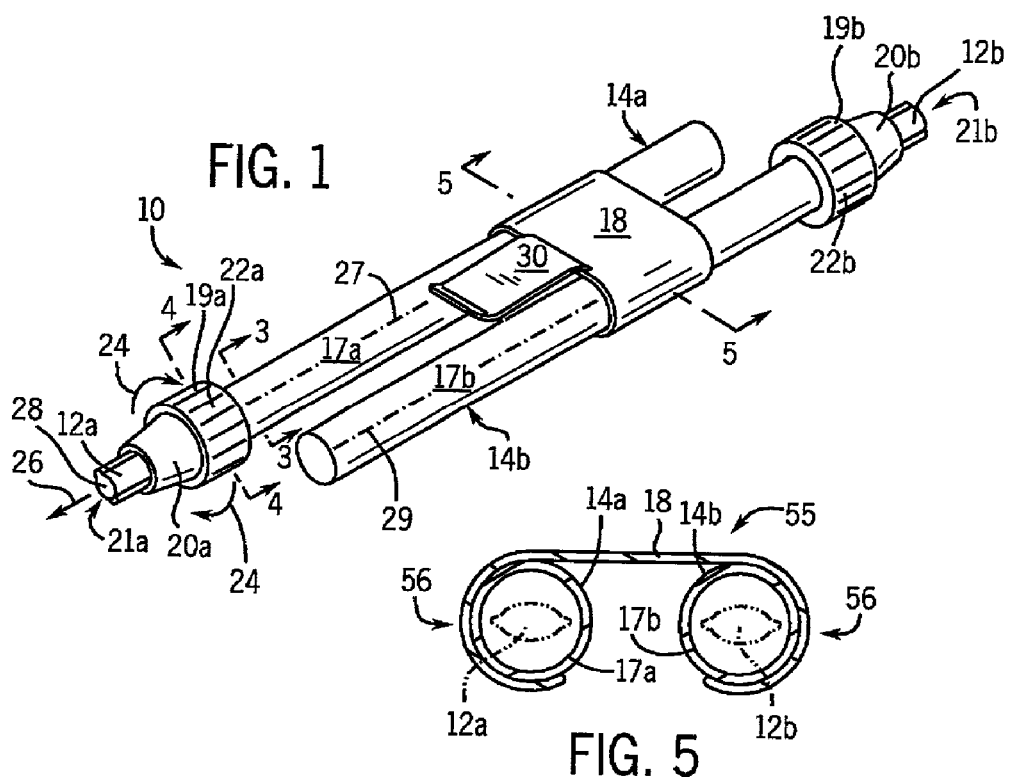
FIG. 1 is a perspective view of a dual temperature indicator stick assembly in accordance with one embodiment of the present invention.

Referring now to FIG. 1, one embodiment of a dual temperature indicator stick assembly 10 according to the present invention is shown. The dual temperature indicator stick assembly 10 is adapted to receive a first indicator stick 12a comprised of a compound which melts at a first given temperature, and a second indicator stick 12b comprised of a compound which melts at a second given temperature. Temperature indicator sticks are generally rated to measure a specific temperature. Preferably, for an assembly 10 having two temperature indicator sticks, a specific temperature rating is marked or labeled on an exterior surface 14a of a first temperature indicator stick housing 17a rating the temperature of the first stick 12a, and an exterior surface 14b of a second temperature indicator stick housing 17b rating the temperature of the second stick 12b so that an operator can know the temperature range for each stick held therein. In one embodiment, the first and second indicator stick housings 17a, 17b may be formed as tubular members of a lightweight material, such as aluminum. In a preferred embodiment for connecting the first indicator stick 12a to the second indicator stick 12b, a connector, such as clamp 18, physically connects the first and second indicator sticks 12a and 12b together. The dual temperature indicator stick assembly 10 also includes a pair of advancement mechanisms, such as rotatable collets 19a, 19b, having tapered sections 20a, 20b that guide outer ends 21a, 22b of the first and second indicator sticks 12a, 12b. Preferably, the advancement mechanisms 19a, 19b have finger grips 22a, 22b to facilitate advancement mechanism rotation. Rotation in the direction of arrows 24 (clockwise) of the advancement mechanism 19a for the first indicator stick housing 17a causes the first temperature indicator stick 12a to extend (i.e. move in a direction of arrow 26) to permit use of an end 28 of the first temperature indicator stick 12a for marking objects. In use, an operator can rotate the advancement mechanism 19a of the first indicator stick housing 17a as desired to extend or retract the first temperature indicator stick 12a from the assembly 10. If the operator rotates the advancement mechanism 19a in a counterclockwise direction, opposite to arrows 24, then the first temperature indicator stick 12a retracts into the first indicator stick housing 17a in a direction opposite to arrow 26 along a first axis 27. Second indicator stick 12b is similarly extended from and retracted into the second indicator stick housing 17b along a second axis 29 using the advancement mechanism 19b affixed to the second housing 17b. The dual temperature indicator stick assembly 10 also includes an optional pocket clip 30 molded to the clamp 18 that permits attachment of the assembly 10 to an object, such as clothing apparel, for rapid use during welding or other operations and storage between such operations.

FIG. 2 is a detailed partial longitudinal cross-section of the dual temperature indicator stick holder 10 of FIG. 1 and is exemplary of both ends 21a, 22b of the holder 10 of FIG. 1. Advancement mechanism 19a is configured to control movement of the first temperature indicator stick 12a. An interior surface 32 of the first indicator stick housing 17a has a plurality of flanges 34 secured thereto and extending therefrom that encircle the first temperature indicator stick 12a. The flanges or pair of resistance mechanisms 34 oppose rotational movement of the first temperature indicator stick 12a in the clockwise direction shown by arrow 24 of FIG. 1 as well as the counterclockwise direction.

The first indicator stick housing 17a includes a pair of annular rings 36 coupled to the advancement mechanism 19a to permit rotation of the advancement mechanism 19a with respect to the first indicator stick housing 17a. The advancement mechanism 19a further includes a series of threads 38 that engage the first temperature indicator stick 12a as the advancement mechanism 19a rotates in a clockwise direction of arrows 40. Rotation of the advancement mechanism 19a in the clockwise direction 40 causes the first temperature indicator stick 12a to extend from the first indicator stick housing 17a along the first axis 27 in a direction of arrow 44.

Upon rotation of the advancement mechanism 19a, cutting threads 38 grip the first temperature indicator stick 12a and cause the stick 12a to be threaded along an outer surface 46. The threads 38 further lock the first temperature indicator stick 12a in a fixed position unless the advancement mechanism 19a is rotated, such as in a direction opposite to arrows 40 which causes retraction of the first indicator stick into the housing 17a. In alternative embodiments, the first and second indicator sticks 17a, 17b may each include single annular rings 36 engageable to the advancement mechanisms 19a, 19b, or may have more than two annular rings.

Furthermore, additional indicator stick housings can be added to the assembly 10 using a second clamp, or a modified clamp configured to receive three or more tubular members if desired.

FIG. 3 is a cross-sectional view taken along line 3-3 of FIG. 1. Flanges 34 connect to the interior surface 32 of the first indicator housing 17a. The first temperature indicator stick 12a is aligned by each of the flanges 34 along first axis 27, and has a generally oval shape. The first temperature indicator stick 12a has a pair of ridges 48 that engage a side edge 50 of the flanges 34 to prevent rotational movement of the first stick 12a in a direction of arrows 52. The flanges 34 further assist in aligning the advancement mechanism 19a with the ridges 48 of the first temperature indicator stick 12a during threading.

FIG. 4 is a cross-sectional view of the first temperature indicator stick 12a partially threaded and is taken along line 4-4 of FIG. 1. Rotation of the advancement mechanism 19a in the direction of arrows 52 causes threads 38 to engage the ridge 48 of the first temperature indicator stick 12a. Engagement of the threads 38 with the ridge 48 causes either extension or retraction of the temperature indicator stick 12a depending on the direction of rotation of the advancement mechanism 19a. During the threading process, residue from the threading of the second temperature indicator stick 12a is removed and deposited into an air pocket 54. Preferably, the temperature indicator stick 12a has two ridges 48 and is oval-shaped to provide space 54 for temperature indicator stick residue. In one embodiment, the threads 38 are configured to engage the ridges 48 only, which creates less temperature indicator stick residue and provides easier advancement since less material is being cut. Other embodiments are also contemplated wherein the first and second temperature indicator sticks 12a, 12b have other non-circular shapes, and are within the scope of the present invention.

Figure 5:
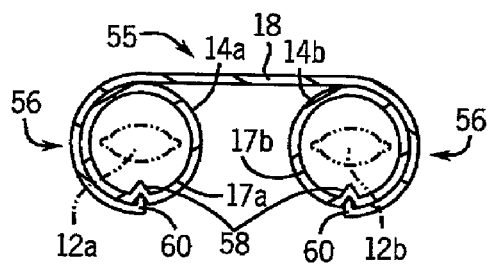
FIG. 5 is a cross-sectional view taken along line 5-5 of FIG. 1.

Referring now to FIG. 5, a cross-sectional view of the dual temperature indicator stick assembly 10 taken along line 5-5 of FIG. 1 is shown. The first and second temperature indicator sticks 12a, 12b are positioned within the first and second indicator stick housings 17a, 17b. Clamp 18 has a longitudinal member 55 and two curved ends 56 that slidingly secure to the outer surfaces 14 of the first and second indicator stick housings 17a, 17b. Preferably, the curved ends 56 encircle a substantial portion of the first and second indicator stick housings 17a, 17b to prevent the housings 17a, 17b from disengaging from the clamp 18.

Figure 6:
FIG. 6 is a view, similar to FIG. 5, of one alternate embodiment of a dual temperature indicator stick assembly according to the present invention.

FIG. 6 is a view, similar to FIG. 5, of one alternative embodiment of a dual temperature indicator stick assembly 10. The outer surfaces 14a, 14b of the first and second indicator stick housings 17a, 17b are formed with indentations 58 that may run generally parallel to axes 27, 29 shown is FIG. 1. The indentations may be configured as a set of grooves capable of engaging the curved ends 56 of the clamp 18. In the alternative embodiment, the curved ends 56 of clamp 18 are formed with hooked ends 60 that are ridged. The hooked ends 60 engage the indentations 58 of the first and second indicator stick housings 17a, 17b and prevent rotation of the first and second indicator stick housings 17a, 17b during rotation of the advancement mechanisms 19a, 19b. That is, torque supplied to each of the housings 17a, 17b during the threading of the first and second temperature indicator sticks 12a, 12b is transferred by the hooked ends 60 engaging the indentations 58 along the outer surfaces 14a, 14b. In other alternative embodiments, the ridges of the hooked ends 60 can be positioned other than at ends of the curved ends 56 of the clamp 18 to engage the first and second indicator stick housings 17a, 17b in a different location along the clamp 18. In yet another embodiment, the first and second indicator stick housings 17a, 17b and/or the clamp 18 may include dimples that engage each other or indentations in the clamp 18 and/or indicator stick housings 17a, 17b to prevent rotation of the indicator stick housings 17a, 17b during extension or retraction of the indicator sticks 12a, 12b.

Figure 7:
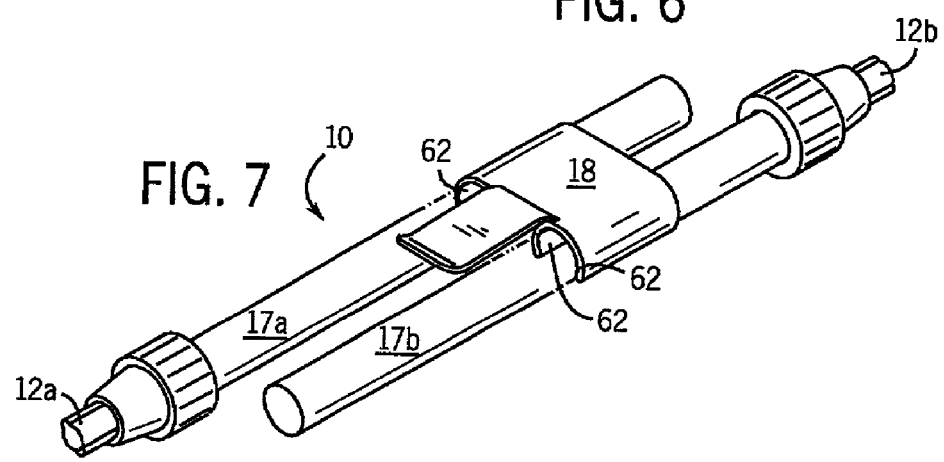
FIG. 7 is a perspective view of an alternative embodiment of a dual temperature indicator stick assembly.

Referring now to FIG. 7, an alternative embodiment of a snap-fit dual temperature indicator stick assembly 10 according to the present invention is shown. The assembly 10 again includes a first housing element 17a and a second housing element 17b that enclose the temperature indicator sticks 12a and 12b, respectively. The first housing element 17a is positioned in a side-by-side relationship to the second housing element 17b by a connector, such as clamp 18. Clamp 18 can be integrally molded to the first and second housing elements 17a, 17b to permit each element 17a, 17b to be snap fit to the clamp 18. In one embodiment, the clamp 18 may be manufactured of a heat resistant material that has a pair of flexible curved sections 62 at each end to permit snap fitting of the first and second housing elements 17a, 17b to the clamp 18.

Since the first and second temperature indicator sticks 12a, 12b are independent from one another and aligned along separate axes 27, 29 as shown in FIG. 1, each of the indicator sticks 12a, 12b can be separately extended and retracted from opposite ends 21a, 22b of the assembly 10. Although FIGS. 1 and 7 provide alternative embodiments of connecting the first and second indicator stick housings 17a, 17b in a side-by-side relationship, other connection mechanisms to attach the first and second indicator stick housings 17a, 17b together along separate axes are also contemplated and within the scope of the present invention.

In operation, the temperature indicator sticks 12a, 12b can be inserted into the first and second indicator stick housings 17a, 17b in different ways. The advancement mechanisms 19a, 19b can be removed from the first and second indicator stick housings 17a, 17b permitting access to the interior. Alternatively, the first and second temperature indicator sticks 12a, 12b can be reverse threaded into their respective housings 17a, 17b. In another alternative embodiment, the first and second indicator stick housings 17a, 17b can be segmented into sections. The sections can be formed to open and permit insertion of a temperature indicator sticks into a section prior to joining the other sections together to form a single indicator stick housing.

In accordance with one aspect of the present invention, a dual temperature indicator stick is disclosed having a first indicator stick positioned along a first axis and comprised of a compound which melts at a first given temperature, and a second indicator stick positioned along a second axis and comprised of a compound which melts at a second given temperature. The dual temperature indicator stick also includes a connector, such as a clamp, that physically secures the first and second indicator sticks together in a side-by-side relationship along different axes.

In accordance with another aspect of the present invention, a dual temperature indicator stick holder includes a connector assembly adapted to receive two temperature indicator sticks aligned along separate axes within the connector assembly. The dual temperature indicator stick holder further includes a pair of advancement mechanisms for extending the two temperature indicator sticks from the connector assembly, wherein each of the pair of advancement mechanisms is configured to engage a respective temperature indicator stick upon rotation of a respective advancement mechanism about one of the two axes.

In yet another aspect of the present invention, a dual temperature indicator stick apparatus has a first means for indicating a first temperature, and a second means for indicating a second temperature. Such means can include a first and second temperature indicator stick. The apparatus further has a means for retaining the first means to the second means in a side-by side relationship to form an indicator stick assembly capable of indicating at least two temperatures.

The present invention has been described in terms of the preferred embodiment, and it is recognized that equivalents, alternatives, and modifications, aside from those expressly stated, are possible and within the scope of the appending claims.

The invention claimed is:

1. A dual temperature indicator stick assembly comprising:
    a first indicator stick housing positioned along a first axis and configured to hold a compound which melts at a first given temperature;
    a second indicator stick housing positioned along a second axis and configured to hold a second compound which melts at a second given temperature;
    a one-piece connector physically connecting the first and second indicator stick housings along different axes;
a pair of resistance mechanisms attached to one of the first and second indicator stick housings to limit rotational movement of the first and second indicator sticks;
    a pair of collets having threads, each collet rotatably coupled to one of the first and second housings; and
    wherein each of the pair of collets is configured to engage separate indicator sticks upon rotation of a collet about one of the first and second axis.

2. The dual temperature indicator stick of claim 1 wherein the connector is configured to snap fit the first and second indicator sticks to the connector.

3. The dual temperature indicator stick of claim 1 wherein the connector includes a clip member configured to permit attachment of the dual temperature indicator stick assembly to an object.

4. The dual temperature indicator stick of claim 1 wherein the connector comprises a longitudinal member having curved ends, the curved ends configured to secure the first and second indicator stick housings to the connector.

5. The dual temperature indicator stick of claim 4 wherein each of the curved ends includes a pair of curved sections.

6. The dual temperature indicator stick of claim 4 wherein the connector slidingly secures the first and second indicator stick housings in a side-by-side relationship.

7. The dual temperature indicator stick of claim 4 wherein the curved ends have hooks configured to engage the first and second indicator stick housings to prevent rotation of the first and second indicator stick housings.

8. The dual temperature indicator stick of claim 7 wherein the first and second indicator stick housings have an exterior surface having a groove therein for engaging the hooks of the curved ends of the longitudinal member.

9. A dual temperature indicator stick holder comprising:
    a connector assembly adapted to receive and position two temperature indicator sticks in a side-by-side relationship;
    a pair of advancement mechanisms configured to extend the two temperature indicator sticks from the connector assembly; and
    wherein each of the pair of advancement mechanisms engages a respective temperature indicator stick upon rotation of a respective advancement mechanism.

10. The dual temperature indicator stick holder of claim 9 wherein the connector assembly includes a clamp to align two temperature indicator stick housing elements along different axes.

11. The dual temperature indicator stick holder of claim 10 wherein the clamp has a longitudinal member having curved ends, the curved ends configured to slidingly secure the two temperature indicator stick housing elements in a side-by-side relationship.

12. The dual temperature indicator stick holder of claim 9 wherein the connector assembly includes a first housing element connected to a second element, each of the first and second housing elements having a single advancement mechanism secured thereto and capable of holding a temperature indicator stick therein.

13. The dual temperature indicator stick holder of claim 12 wherein the connector assembly further includes a pair of resistance mechanisms attached to one of the first and second housing elements to limit rotational movement of the two temperature indicator sticks.

14. The dual temperature indicator stick holder of claim 12 wherein the first and second housing elements each has a groove on an outer surface to engage an end of a clamp and prevent rotation of the first and second housing elements.

15. A dual temperature indicator stick assembly comprising:
    a first indicator stick housing positioned along a first axis and configured to hold a compound which melts at a first given temperature;
    a second indicator stick housing positioned along a second axis and configured to hold a second compound which melts at a second given temperature;
    a one-piece connector physically connecting the first and second indicator stick housings along different axes;
    wherein the one-piece connector is configured to prevent rotation of the first and second indicator stick housings;
    wherein the connector comprises a longitudinal member having curved ends, the curved ends configured to secure the first and second indicator stick housings to the connector; and
    wherein the curved ends have hooks configured to engage the first and second indicator stick housings.

16. The dual temperature indicator stick of claim 15 wherein the first and second indicator stick housings have an exterior surface having a groove therein for engaging the hooks of the curved ends of the longitudinal member.

17. The dual temperature indicator stick of claim 15 wherein the connector slidingly secures the first and second indicator stick housings in a side-by-side relationship.

* * * * *

UNITED STATES PATENT AND TRADEMARK OFFICE
CERTIFICATE OF CORRECTION

PATENT NO. : 7,316,506 B2  
APPLICATION NO. : 09/683353  
DATED : January 8, 2008  
INVENTOR(S) : Victor I. Deonarine It is certified that error appears in the above-identified patent and that said Letters Patent is hereby corrected as shown below:

Title Page, item 75 line 2, after "Victor" insert -- I. --;

Col. 7, line 38 (Claim 3), delete "pennit" and substitute therefore -- permit --.

Signed and Sealed this

Sixth Day of May, 2008

JON W. DUDAS  
*Director of the United States Patent and Trademark Office*